(12) United States Patent
Paramasivam et al.

(10) Patent No.: US 12,557,082 B2
(45) Date of Patent: Feb. 17, 2026

(54) SYSTEMS AND METHODS FOR SERVICING ORPHANED SENSORS IN A BUILDING CONTROL SYSTEM

(71) Applicant: Honeywell International Inc., Charlotte, NC (US)

(72) Inventors: Venkatesh Paramasivam, Bangalore (IN); Ruban S, Tamilnadu (IN); Eldhose K. George, Kerala (IN); Balamurugan Ganesan, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 344 days.

(21) Appl. No.: 18/464,881

(22) Filed: Sep. 11, 2023

(65) Prior Publication Data

US 2025/0089024 A1    Mar. 13, 2025

(51) Int. Cl.
*H04W 72/0446* (2023.01)
*H04W 24/04* (2009.01)

(52) U.S. Cl.
CPC ....... *H04W 72/0446* (2013.01); *H04W 24/04* (2013.01)

(58) Field of Classification Search
CPC .. H04B 7/195; H04B 7/18519; H04B 7/1851; H04W 84/06; H04W 48/12; H04W 52/0216; H04W 52/0245; H04W 52/0258
See application file for complete search history.

(56) References Cited

U.S. PATENT DOCUMENTS

| 6,104,301 A * | 8/2000 | Golden ............... A62C 37/40 169/61 |
| 7,940,675 B2 | 5/2011 | Mulligan et al. |

(Continued)

FOREIGN PATENT DOCUMENTS

| CN | 102665253 A | 9/2012 |
| KR | 101526121 B1 | 6/2015 |

OTHER PUBLICATIONS

Jerbi et al., "A Novel Clustering Algorithm for Coverage A Large Scale in Wireless Sensor Networks," International Journal on Computational Science & Applications (IJCSA), vol. 6, No. 2, pp. 1-16, Apr. 2016.

(Continued)

*Primary Examiner* — Ankur Jain
(74) *Attorney, Agent, or Firm* — Seager, Tufte & Wickhem, LLP

(57) ABSTRACT

Each of a plurality of non-orphaned RF sensors may be assigned to a corresponding one of a plurality of communication slots. Emergency messages and non-emergency messages are received from each of the non-orphaned RF sensors. One or more emergency messages and non-emergency messages are sent to a remote device via a building control network. Each of the orphaned RF sensors are assigned to a corresponding one of a plurality of emergency communication slots. Emergency messages are received from each of the orphaned RF sensors that are assigned to one of the emergency communication slots, but not non-emergency messages. One or more emergency messages are sent to the remote device that are based at least in part on the emergency messages received from each of the one or more orphaned RF sensors that are assigned to one of the plurality of emergency communication slots.

20 Claims, 4 Drawing Sheets

(56) References Cited

U.S. PATENT DOCUMENTS

| | | | | |
|---|---|---|---|---|
| 8,040,828 | B2* | 10/2011 | Kim | H04W 52/0216 |
| | | | | 370/312 |
| 8,442,023 | B2* | 5/2013 | Ghanadan | H04W 72/535 |
| | | | | 370/347 |
| 10,080,225 | B2* | 9/2018 | Rittenhouse | H04W 24/04 |
| 2006/0092896 | A1* | 5/2006 | Mulligan | H04W 76/50 |
| | | | | 370/338 |
| 2013/0314229 | A1* | 11/2013 | Tu | G08B 23/00 |
| | | | | 340/539.22 |
| 2016/0066249 | A1* | 3/2016 | Dukes | H04W 40/246 |
| | | | | 370/255 |

OTHER PUBLICATIONS

Pan et al., "The Orphan Problem in ZigBee Wireless Networks," IEEE Transactions on Mobile Computing, pp. 1-12, 2007.
Extended European Search Report, EP Application No. 24195109.4, European Patent Office, Jan. 30, 2025 (12 pages).

* cited by examiner

SYSTEMS AND METHODS FOR SERVICING ORPHANED SENSORS IN A BUILDING CONTROL SYSTEM

TECHNICAL FIELD

The present disclosure relates generally to methods and systems for communication in a building control system and more particularly to methods and systems for communication with orphaned sensors in a building control system.

BACKGROUND

Building control systems such as security systems, fire safety systems and HVAC (Heating, Ventilating and Air Conditioning) systems can include a large number of individual building control devices that communicate wirelessly. In some instances, communication with an individual building control device may fail, potentially orphaning the building control device and preventing the orphaned building control device from providing a critical alarm or other event to the building control system. What would be desirable are methods and systems for establishing emergency communication with orphaned building control devices.

SUMMARY

The present disclosure relates generally to methods and systems for communication in a building control system and more particularly to methods and systems for communication with orphaned sensors in a building control system. An example may be found in a method for operating a wireless (e.g. Radio Frequency) node of a building control network to service non-orphaned and orphaned wireless (e.g. RF) sensors. The illustrative method includes assigning each of a plurality of non-orphaned RF sensors to a corresponding one of a plurality of communication slots of an RF node. During operation, emergency messages and non-emergency messages are received from each of the plurality of non-orphaned RF sensors assigned to one of the plurality of communication slots of the RF node. One or more emergency messages and non-emergency messages are sent from the RF node to a remote device via the building control network, wherein the one or more emergency messages and non-emergency messages are based at least in part on the emergency messages and non-emergency messages received from each of the plurality of non-orphaned RF sensors that are assigned to one of the plurality of communication slots of the RF node.

Each of one or more orphaned RF sensors are assigned to a corresponding one of a plurality of emergency communication slots of the RF node. In some instances, the number of emergency communication slots are separate from the number of communication slots used by the non-orphaned RF sensors. Emergency messages are received from each of the one or more orphaned RF sensors that are assigned to one of the plurality of emergency communication slots, but not non-emergency messages. One or more emergency messages are sent from the RF node to the remote device via the building control network, wherein the one or more emergency messages are based at least in part on the emergency messages received from each of the one or more orphaned RF sensors that are assigned to one of the plurality of emergency communication slots.

Another example may be found in a building control system. The building control system includes a controller, two or more RF nodes operatively coupled to the controller, and a plurality of RF sensors each operatively coupled to a corresponding one of the two or more RF nodes. Each of the plurality of RF sensors is assigned to a corresponding one of a plurality of communication slots of a corresponding RF node. The controller is configured to determine when one of the plurality of RF sensors goes missing, and to instructs another one of the two or more RF nodes to establish communication with the missing RF sensor by assigning the missing RF sensor to one of the plurality of communication slots of the other RF node when a communication slot is available. When a communication slot of the other RF node is not available, the controller is configured to send a sensor ID of the missing RF sensor to an emergency whitelist stored by each of the two or more RF nodes, the missing RF sensor now being considered an orphaned RF sensor. One of the two or more RF nodes is configured to read the emergency whitelist and assign the orphaned RF sensor to a corresponding one of a plurality of emergency communication slots of the corresponding RF node, if available, and to inform the controller that the orphaned RF sensor has been assigned to a corresponding one of the plurality of emergency communication slots of the corresponding RF node. The controller is then configured to remove the orphaned RF sensor from the emergency whitelist of the other of the two or more RF nodes. The assigned RF nodes is configured to receive messages from the orphaned RF sensor, and to send one or more messages to the controller, wherein the one or more messages are based at least in part on the messages received from the orphaned RF sensor.

Another example may be found in a non-transitory computer readable medium storing instructions that when executed by one or more processors of an RF node on a building control network causes the one or more processors to assign each of a plurality of non-orphaned RF sensors to a corresponding one of a plurality of communication slots of the RF node. The one or more processors are caused to receive emergency messages and non-emergency messages from each of the plurality of non-orphaned RF sensors that are assigned to one of the plurality of communication slots of the RF node. The one or more processors are caused to send one or more emergency messages and non-emergency messages to a remote device via the building control network, wherein the one or more emergency messages and non-emergency messages are based at least in part on the emergency messages and non-emergency messages received from each of the plurality of non-orphaned RF sensors that are assigned to one of the plurality of communication slots of the RF node. The one or more processors are caused to assign each of one or more orphaned RF sensors to a corresponding one of a plurality of emergency communication slots of the RF node. The one or more processors are caused to receive emergency messages from each of the one or more orphaned RF sensors that are assigned to one of the plurality of emergency communication slots of the RF node, but not non-emergency messages. The one or more processors are caused to send one or more emergency messages to the remote device via the building control network, wherein the one or more emergency messages are based at least in part on the emergency messages received from each of the one or more orphaned RF sensors that are assigned to one of the plurality of emergency communication slots of the RF node.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
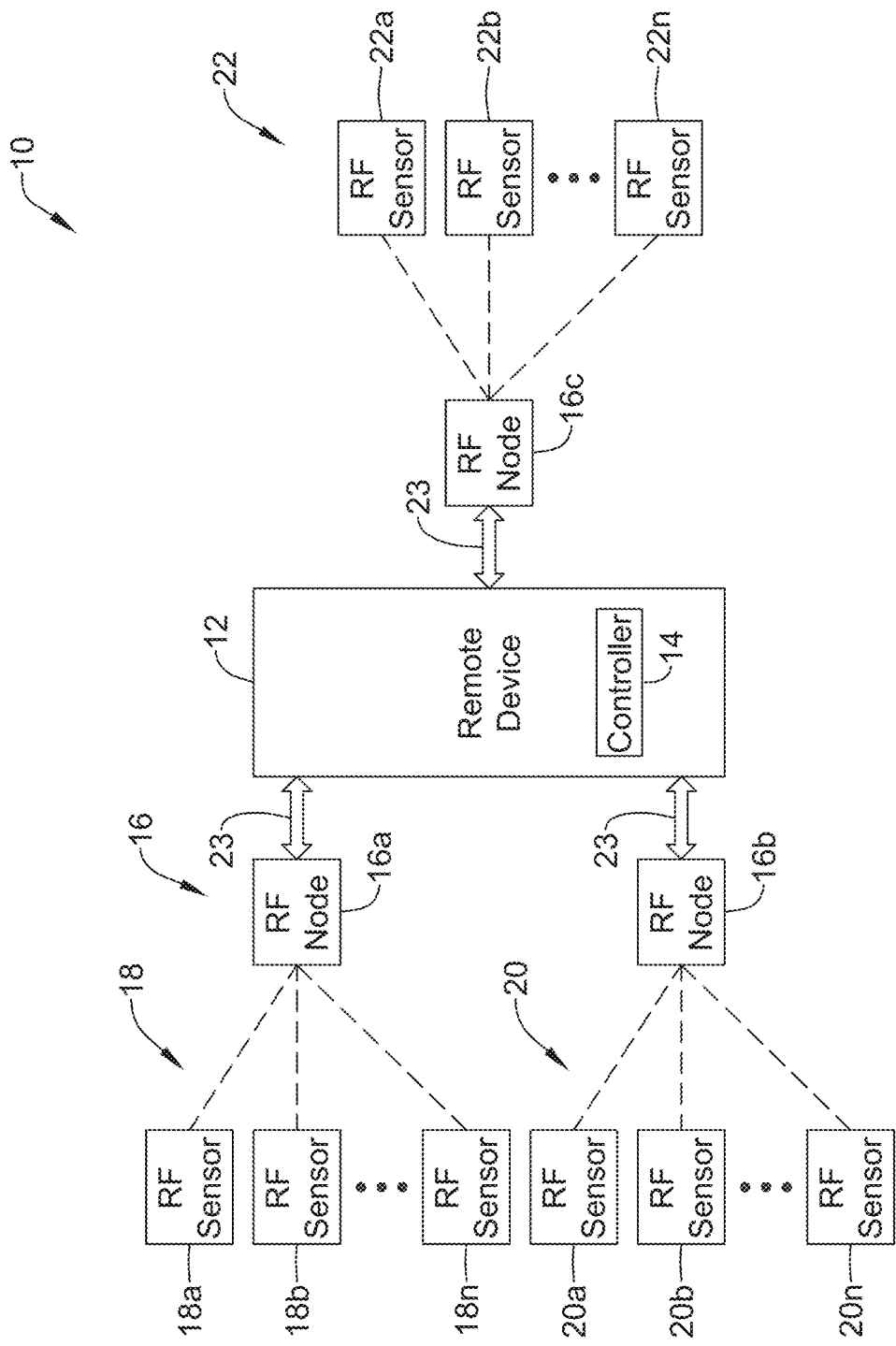
FIG. 1 is a schematic block diagram showing an illustrative building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/of" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative building control system 10. The illustrative building control system 10 may generally represent any of a security system, a lighting system, a Heating, Ventilating and Air Conditioning (HVAC) system, and/or the like. The illustrative building control system 10 includes a remote device 12. In some instances, the remote device 12 may be a control panel. In some instances, the remote device 12 may include a controller 14 that controls operation of at least some components of the building control system 10. In some instances, the controller 14 is the remote device 12. The building control system 10 includes two or more RF nodes 16, individually labeled as 16a, 16b and 16c. This is merely illustrative, as the building control system 10 may include any number of RF nodes 16. In some instances, at least some of the RF nodes 16 may be RF routers or gateways. In some instances, at least some of the RF nodes 16 may be RF routers within a security system.

Each of the RF nodes 16 may include a number of communication slots by which the RF node 16 can communicate with a corresponding sensor. In some instances, each of the RF nodes 16 may include a number of primary communication channels (e.g. slots) and a number of secondary communication channels (e.g. slots). In some instances, each of the RF nodes 16 may be configured to also provide a number of emergency communication channels (e.g. slots) that may be relied upon for communication with a particular RF node 16 even when all of the primary communication channels and all of the secondary communication channels (e.g. slots) for that particular RF node 16 are being used. As an example, each RF node 16 may include a total of 24 primary communication channels, 24 secondary communication channels and 6 emergency communication channels. This is merely illustrative, as an RF node 16 may have any number of primary communication channels, any number of secondary communication channels and any number of emergency communication channels.

The building control system 10 includes a plurality of RF sensors, including RF sensors 18, individually labeled as 18a, 18b and through 18n; RF sensors, individually labeled as 20a, 20b and through 20n; and RF sensors 22, individually labeled as 22a, 22b and through 22n. Each of the RF sensors 18, 20 and 22 may be assigned to a corresponding one of the RF nodes 16. As an example, the RF sensors 18 may each be assigned to particular communication slots of the RF node 16a, the RF sensors 20 may each be assigned to particular communication slots of the RF node 16b, and the RF sensors 22 may each be assigned to particular communication slots of the RF node 16c. In some instances, at least some of the RF sensors 18, 20 and 22 may be wireless security sensors such as motion sensors, door sensors, window sensors, glass break detectors, and the like. The RF nodes 16 each communicate with the remote device 12 (and/or the controller 14) via a building control network 23. The communication network may be wired, wireless or a combination of wired and wireless.

In some instances, wireless communications within the building control system 10 may fail on occasion. For example, one of the RF nodes 16 may become disabled or otherwise inoperative. Temporary events may interfere with wireless communication. As an example, operation of an unshielded electric motor may cause temporary drops in wireless communication between at least some devices within the building control system 10. In some instances, the building control system 10 may be configured to deal with problems that may occur in the wireless communication between devices. In some cases, a communication cable of the building control system may become disconnected or damaged.

In some instances, the controller 14 may be configured to determine when one of the plurality of RF sensors 18, 20 and 22 goes missing and to instruct another one of the two or more RF nodes 16 to establish communication with the missing RF sensor 18, 20, 22 by assigning the missing RF sensor 18, 20, 22 to one of the plurality of communication slots (e.g. a secondary communication slot) when a communication slot (e.g. a secondary communication slot) is available. In some cases, the RF node 16 with the highest signal strength and/or the highest signal to noise ratio (SNR) with the missing RF sensor 18, 20, 22 is selected to assigning the missing RF sensor 18, 20, 22 to one of the plurality of communication slots (e.g. a secondary communication slot) when a communication slot (e.g. a secondary communication slot) is available. When none of the RF nodes have an available communication slot (e.g. a secondary communication slot), the controller 14 is configured to add a sensor ID of the missing RF sensor 18, 20, 22 to an emergency whitelist that is sent to each of the two or more RF nodes 16, and the missing RF sensor 18, 20, 22 may be considered an orphaned RF sensor.

The RF nodes 16 are configured to read the emergency whitelist, and one of the RF nodes 16 is configured to assign the orphaned RF sensor to a corresponding one of a plurality of emergency communication slots of the corresponding RF node 16, if available. In some cases, the RF node 16 with the highest signal strength and/or the highest signal to noise ratio (SNR) with the orphaned RF sensor is selected to assigning the orphaned RF sensor to one of the plurality of emergency slots, when an emergency slot is available. The RF node that assigned the orphaned RF sensor to one of its plurality of emergency slots is configured to inform the controller 14 that the orphaned RF sensor has been assigned a corresponding one of the plurality of emergency communication slots of the corresponding RF node 16. In response, the controller 14 is configured to remove the orphaned RF sensor from the emergency whitelist of the other of the two or more RF nodes 16. The RF node that assigned the orphaned RF sensor to one of its plurality of emergency slots is configured to receive messages from the orphaned RF sensor and to send one or more messages to the controller 14, wherein the one or more messages are based at least in part on the messages received from the orphaned RF sensor. In some instances, the RF node that assigned the orphaned RF sensor to one of its plurality of emergency slots receives emergency messages but not non-emergency messages from the orphaned RF sensor. This helps reduced the load on the RF node yet allows emergency messages to be communicated from the orphaned RF node to the remote device 12.

In some instances, an RF sensor 18, 20, 22 may go missing because of a failure of the RF node 16 to which the RF sensor 18, 20, 22 was assigned, and that RF node 16 may subsequently recover. In this situation, the controller 14 and/or the recovered RF node 16 may be configured to cause the orphaned RF sensor to be assigned to a corresponding one of the plurality of communication slots of the recovered RF node 16. In some instances, the controller 14 and/or the recovered RF node 16 may be configured to remove the orphaned RF sensor from the emergency whitelist of all of the two or more RF nodes 16.

Figure 2A:
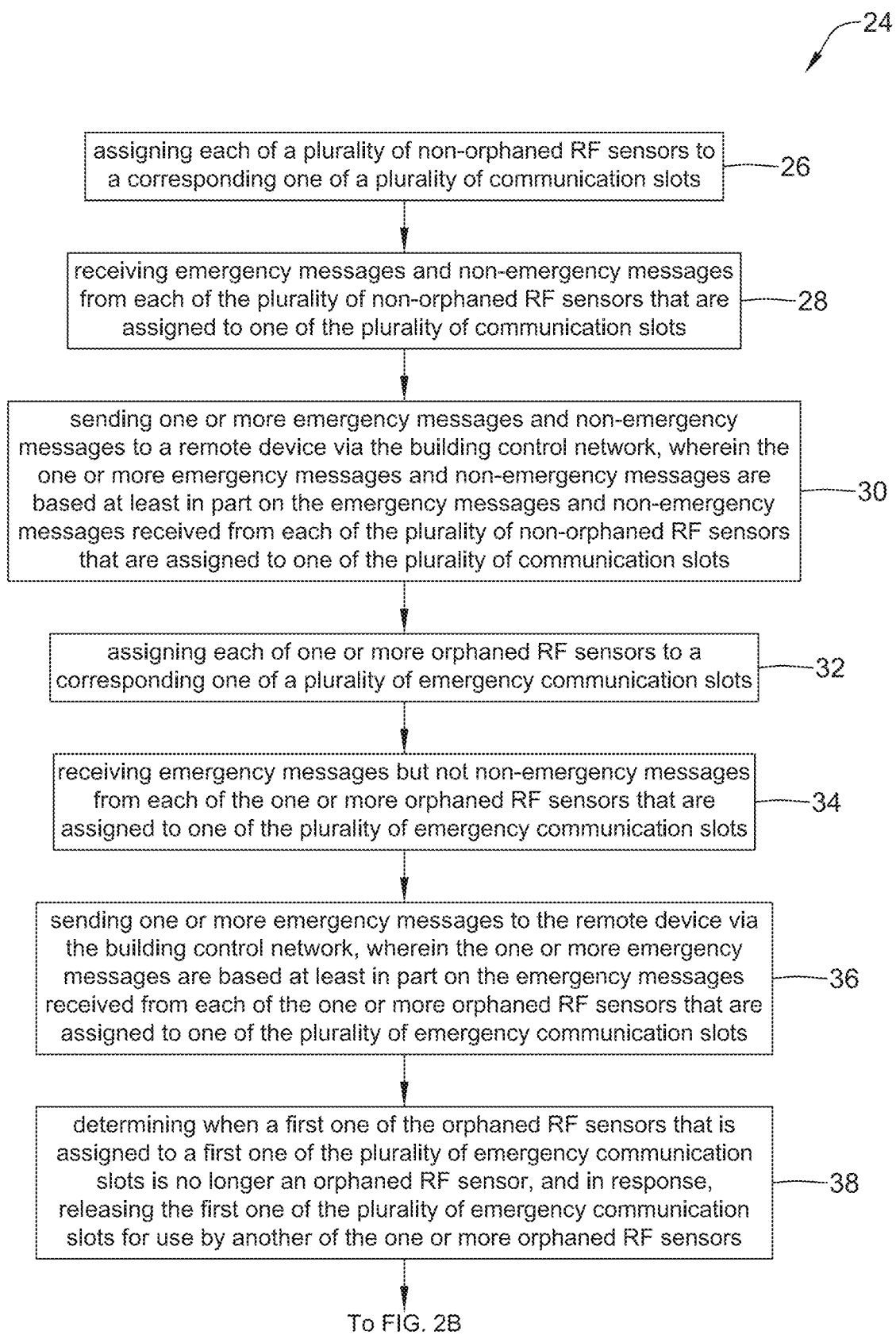
FIGS. 2A and 2B are flow diagrams that together show an illustrative method.
Figure 2B:
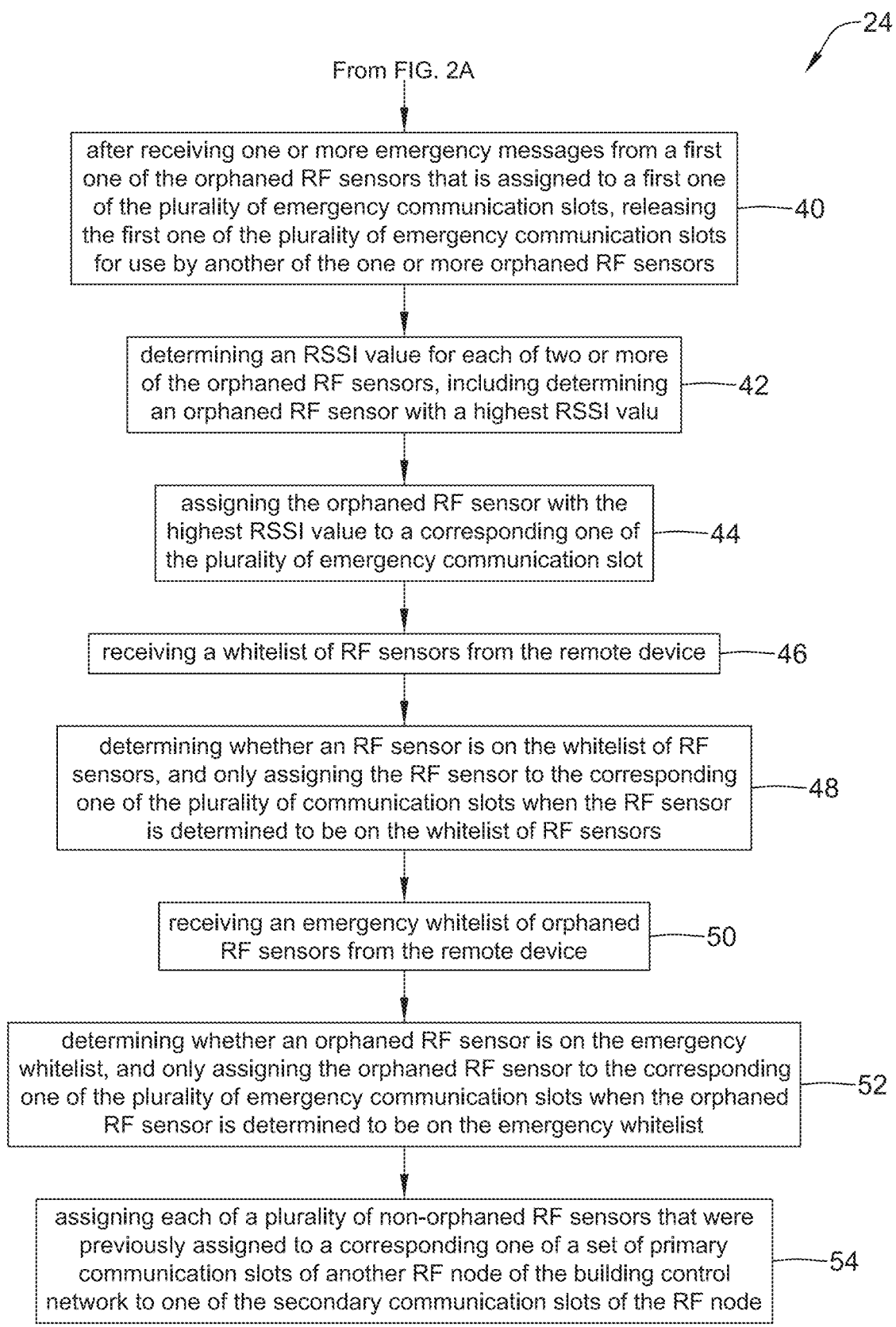

FIGS. 2A and 2B are flow diagrams that together show an illustrative method 24 for operating an RF node of a building control network to service non-orphaned and orphaned RF sensors. As an example, the RF node may be an RF router or RF gateway of a security system of a building and the non-orphaned RF sensors and the orphaned RF sensors may be security system sensors.

The illustrative method 24 includes assigning each of a plurality of non-orphaned RF sensors to a corresponding one of a plurality of communication slots, as indicated at block 26. In some instances, the plurality of communication slots may include a set of primary communication slots and a set of secondary communication slots, and the method 24 may further include assigning each of a plurality of non-orphaned RF sensors that were previously assigned to a corresponding one of a set of primary communication slots of another RF node of the building control network to one of the secondary communication slots of the RF node. Each RF node may also include a number of emergency communication slots. The number of primary and secondary communication slots of the RF node may exceed the number of emergency communication slots of the RF node. In some instances, the RF node may be an RF router and the remote device may include a controller.

Emergency messages and non-emergency messages are received from each of the plurality of non-orphaned RF sensors that are assigned to one of the plurality of communication slots (e.g. primary or secondary), as indicated at block 28. Emergency messages may include one or more of an alarm message and a sensor tamper message, for example. In some instances, non-emergency messages may include one or more of a periodic supervision message (e.g. watchdog message) and a low battery message. Additional emergency messages and non-emergency messages are contemplated. One or more emergency messages and non-emergency messages are sent to a remote device 12 via the building control network 23, wherein the one or more emergency messages and non-emergency messages are based at least in part on the emergency messages and non-emergency messages received from each of the plurality of non-orphaned RF sensors that are assigned to one of the plurality of communication slots (e.g. primary or secondary), as indicated at block 30.

Each of one or more orphaned RF sensors are assigned to a corresponding one of the plurality of emergency communication slots, as indicated at block 32. Emergency messages are received from each of the one or more orphaned RF sensors that are assigned to one of the plurality of emergency communication slots, but not non-emergency messages, as indicated at block 34. One or more emergency messages are sent to the remote device 12 via the building control network 23, wherein the one or more emergency messages are based at least in part on the emergency messages received from each of the one or more orphaned RF sensors that are assigned to one of the plurality of emergency communication slots, as indicated at block 36. In some instances, the method 24 may include determining when a first one of the orphaned RF sensors that is assigned to a first one of the plurality of emergency communication slots is no longer an orphaned RF sensor, and in response, release the first one of the plurality of emergency communication slots for use by another of the one or more orphaned RF sensors, as indicated at block 38.

In some instances, and continuing on FIG. 2B, the method 24 may include, after receiving one or more emergency messages from a first one of the orphaned RF sensors that is assigned to a first one of the plurality of emergency communication slots, releasing the first one of the plurality of emergency communication slots for use by another of the one or more orphaned RF sensors, as indicated at block 40. When the orphaned RF sensors again has an emergency message, the orphaned RF sensors may request to be assigned one of the plurality of emergency communication slots.

In some instances, the method 24 may include determining an RSSI value for each of two or more of the orphaned RF sensors, including determining an orphaned RF sensor with a highest RSSI value, as indicated at block 42. The orphaned RF sensor with the highest RSSI value may be assigned to a corresponding one of the plurality of emergency communication slots, as indicated at block 44.

In some instances, the method 24 may include receiving a whitelist of RF sensors from a remote device, as indicated at block 46. A determination may be made as to whether an RF sensor is on the whitelist of RF sensors, and the RF sensor may only be assigned to the corresponding one of the plurality of communication slots when the RF sensor is determined to be on the whitelist of RF sensors, as indicated at block 48. In some instances, the method 24 may include receiving an emergency whitelist of orphaned RF sensors from the remote device, as indicated at block 50. A determination may be made as to whether an orphaned RF sensor is on the emergency whitelist, and the orphaned RF sensor may only be assigned to a corresponding one of the plurality of emergency communication slots when the orphaned RF sensor is determined to be on the emergency whitelist, as indicated at block 52. This may help ensure only authorized devices are allowed to communicate on the building control network. In some instances, the emergency whitelist of orphaned RF sensors may not include orphaned RF sensors that are assigned to a corresponding one of a plurality of emergency communication slots of another RF node of the building control network.

Figure 3:
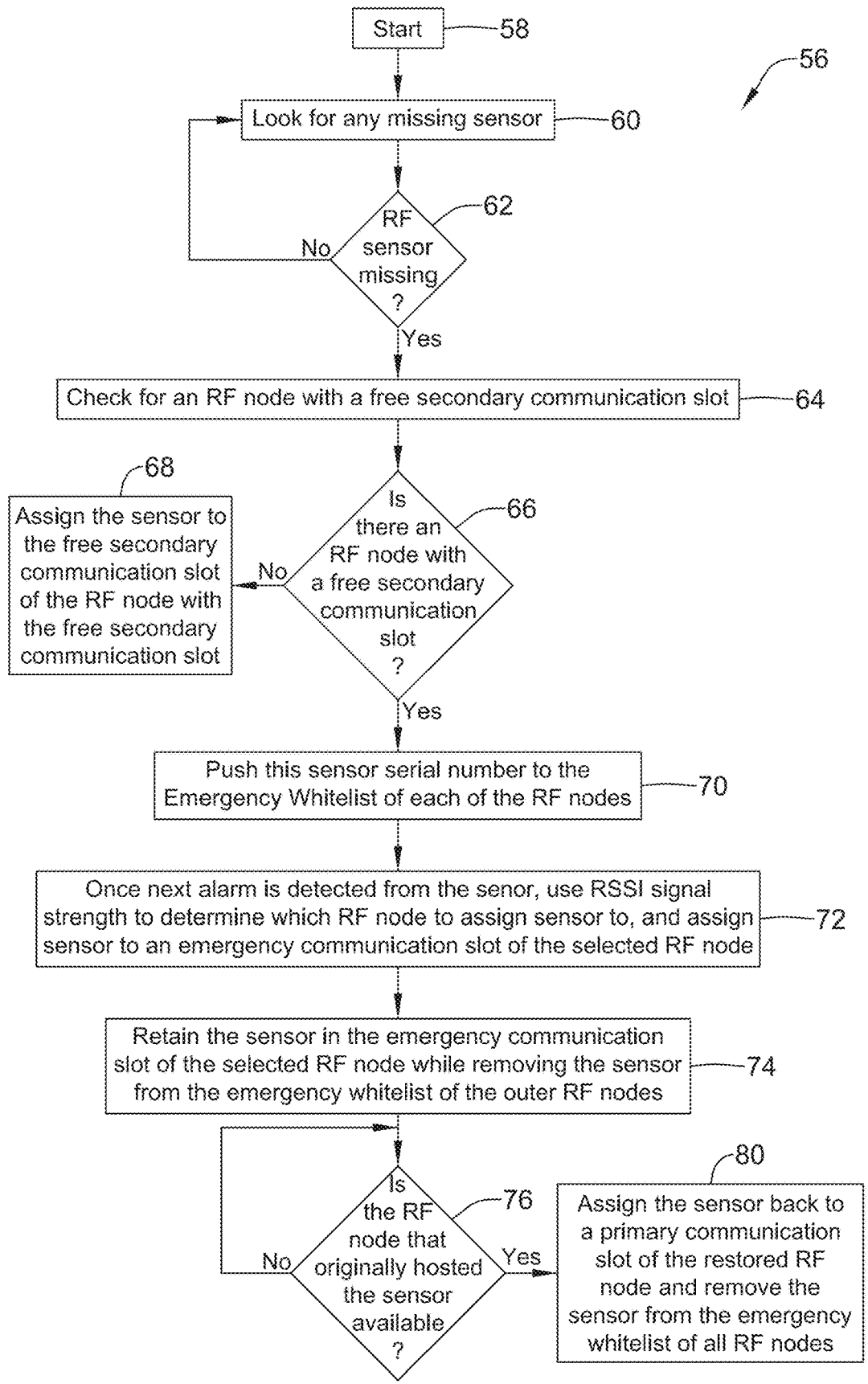
FIG. 3 is a flow diagram showing an illustrative method.

FIG. 3 is a flow diagram showing an illustrative method 56. The illustrative method 56 begins at a start block 58. Control passes to a block 60, where a watch is maintained looking for any missing RF sensors. At decision block 62, a determination is made as to whether there are any missing sensors (e.g. because an RF node has gone offline). If there are no missing RF sensors, control reverts to block 60. If there are missing RF sensors, control passes to block 64, where a check is made for any RF nodes that have a free secondary communication slot. In this example, each RF node maintains a plurality of primary communication slots, a plurality of secondary communication slots and a plurality of emergency communication slots. At a decision block 66, a determination is made as to whether there is an RF node that includes a free secondary communication slot for the missing sensor. If so, control passes to block 68, where the missing sensor is assigned to the free secondary slot of the selected RF node.

Otherwise, control passes to block 70, where the serial number (or other identifier) for the missing sensor is pushed to an emergency whitelist of each of the RF nodes. At block 72, once a next emergency message (e.g. alarm) is to be send by the sensor, the RSSI signal strength may be used to determine which RF node to assign the sensor, and then assign the sensor to an emergency communication slot of the selected RF node. The sensor may retain the emergency communication slot of the selected RF node, while the sensor identifier may be removed from the emergency whitelist of the other RF nodes, as indicated at block 74. A determination is made at decision block 76 as to whether the RF node that originally hosted the sensor via a primary communication slot has been restored. If not, control is passaged back to block 76, where a determination is made as to whether the RF node that originally hosted the sensor via a primary communication slot has been restored. If so, control passes to a decision block 80 where the sensor is assigned to a primary communication slot of the restored RF node, and the sensor ID is removed from the emergency whitelist from all of the RF nodes.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for operating an RF node of a building control network to service non-orphaned and orphaned RF sensors, the method comprising:
    assigning each of a plurality of non-orphaned RF sensors to a corresponding one of a plurality of communication slots;
    receiving emergency messages and non-emergency messages from each of the plurality of non-orphaned RF sensors that are assigned to one of the plurality of communication slots;
    sending one or more emergency messages and non-emergency messages to a remote device via the building control network, wherein the one or more emergency messages and non-emergency messages are based at least in part on the emergency messages and non-emergency messages received from each of the plurality of non-orphaned RF sensors that are assigned to one of the plurality of communication slots;
    assigning each of one or more orphaned RF sensors to a corresponding one of a plurality of emergency communication slots;
    receiving emergency messages but not non-emergency messages from each of the one or more orphaned RF sensors that are assigned to one of the plurality of emergency communication slots; and
    sending one or more emergency messages to the remote device via the building control network, wherein the one or more emergency messages are based at least in part on the emergency messages received from each of the one or more orphaned RF sensors that are assigned to one of the plurality of emergency communication slots.

2. The method of claim 1, further comprising:
    determining when a first one of the orphaned RF sensors that is assigned to a first one of the plurality of emergency communication slots is no longer an orphaned RF sensor, and in response, releasing the first one of the plurality of emergency communication slots for use by another of the one or more orphaned RF sensors.

3. The method of claim 1, further comprising:
    after receiving one or more emergency messages from a first one of the orphaned RF sensors that is assigned to a first one of the plurality of emergency communication slots, releasing the first one of the plurality of emergency communication slots for use by another of the one or more orphaned RF sensors.

4. The method of claim 1, further comprising:
    determining an RSSI value for each of two or more of the orphaned RF sensors, including determining an orphaned RF sensor with a highest RSSI value; and
    assigning the orphaned RF sensor with the highest RSSI value to a corresponding one of the plurality of emergency communication slots.

5. The method of claim 1, wherein the emergency messages include one or more of an alarm message and a sensor tamper message.

6. The method of claim 1, wherein the non-emergency messages include one or more of a periodic supervision message and a low battery message.

7. The method of claim 1, further comprising:
receiving a whitelist of RF sensors from the remote device; and
determining whether an RF sensor is on the whitelist of RF sensors, and only assigning the RF sensor to the corresponding one of the plurality of communication slots when the RF sensor is determined to be on the whitelist of RF sensors.

8. The method of claim 1, further comprising:
receiving an emergency whitelist of orphaned RF sensors from the remote device; and
determining whether an orphaned RF sensor is on the emergency whitelist, and only assigning the orphaned RF sensor to the corresponding one of the plurality of emergency communication slots when the orphaned RF sensor is determined to be on the emergency whitelist.

9. The method of claim 8, further comprising:
wherein the emergency whitelist of orphaned RF sensors does not include orphaned RF sensors that are assigned to a corresponding one of a plurality of emergency communication slots of another RF node of the building control network.

10. The method of claim 1, wherein the plurality of communication slots include a set of primary communication slots and a set of secondary communication slots, the method comprising:
assigning each of a plurality of non-orphaned RF sensors that were previously assigned to a corresponding one of a set of primary communication slots of another RF node of the building control network to one of the secondary communication slots of the RF node.

11. The method of claim 1, wherein the number of communication slots of the RF node exceeds the number of emergency communication slots of the RF node.

12. The method of claim 1, wherein the RF node is an RF router, and the remote device includes a controller.

13. The method of claim 1, wherein the RF node is an RF router of a security system of a building, and the non-orphaned RF sensors and orphaned RF sensors are security system sensors.

14. A building control system comprising:
a controller;
two or more RF nodes operatively coupled to the controller;
a plurality of RF sensors each operatively coupled to a corresponding one of the two or more RF nodes, wherein each of the plurality of RF sensors is assigned to a corresponding one of a plurality of communication slots of the corresponding RF node;
the controller is configured to:
determine when one of the plurality of RF sensors goes missing;
instruct another one of the two or more RF nodes to establish communication with the missing RF sensor by assigning the missing RF sensor to one of the plurality of communication slots of the other RF node when a communication slot is available;
when a communication slot of the other RF node is not available, sending a sensor ID of the missing RF sensor to an emergency whitelist stored by each of the two or more RF nodes, the missing RF sensor now being an orphaned RF sensor;
one of the two or more RF nodes is configured to:

read the emergency whitelist and assign the orphaned RF sensor to a corresponding one of a plurality of emergency communication slots of the corresponding RF node, if available;
inform the controller that the orphaned RF sensor has been assigned a corresponding one of the plurality of emergency communication slots of the corresponding RF node, wherein the controller is configured to remove the orphaned RF sensor from the emergency whitelist of the other of the two or more RF nodes;
receive messages from the orphaned RF sensor; and
send one or more messages to the controller, wherein the one or more messages are based at least in part on the messages received from the orphaned RF sensor.

15. The building control system of claim 14, wherein the one of the two or more RF nodes receives emergency messages but not non-emergency messages from the orphaned RF sensor.

16. The building control system of claim 14, where when the one of the plurality of RF sensors goes missing because a failed one of the two or more RF nodes had a failure, and the failed one of the two or more RF nodes has now recovered, the controller and/or the recovered RF node configured to:
cause the orphaned RF sensor to be assigned to a corresponding one of the plurality of communication slots of the recovered RF node; and
remove the orphaned RF sensor from the emergency whitelist of all of the two or more RF nodes.

17. A non-transitory computer readable medium storing instructions that when executed by one or more processors of an RF node on a building control network causes the one or more processors to:
assign each of a plurality of non-orphaned RF sensors to a corresponding one of a plurality of communication slots of the RF node;
receive emergency messages and non-emergency messages from each of the plurality of non-orphaned RF sensors that are assigned to one of the plurality of communication slots of the RF node;
send one or more emergency messages and non-emergency messages to a remote device via the building control network, wherein the one or more emergency messages and non-emergency messages are based at least in part on the emergency messages and non-emergency messages received from each of the plurality of non-orphaned RF sensors that are assigned to one of the plurality of communication slots of the RF node;
assign each of one or more orphaned RF sensors to a corresponding one of a plurality of emergency communication slots of the RF node;
receive emergency messages but not non-emergency messages from each of the one or more orphaned RF sensors that are assigned to one of the plurality of emergency communication slots of the RF node; and
send one or more emergency messages to the remote device via the building control network, wherein the one or more emergency messages are based at least in part on the emergency messages received from each of the one or more orphaned RF sensors that are assigned to one of the plurality of emergency communication slots of the RF node.

18. The non-transitory computer readable medium of claim 17, wherein the instructions cause the one or more processors to:

determine when a first one of the one or more orphaned RF sensors that is assigned to a first one of the plurality of emergency communication slots is no longer an orphaned RF sensor, and in response, release the first one of the plurality of emergency communication slots for use by another of the one or more orphaned RF sensors.

19. The non-transitory computer readable medium of claim 17, wherein the instructions cause the one or more processors to:

determine an RSSI value for each of two or more of the orphaned RF sensors, including determining an orphaned RF sensor with a highest RSSI value; and assign the orphaned RF sensor with the highest RSSI value to a corresponding one of the plurality of emergency communication slots.

20. The non-transitory computer readable medium of claim 17, wherein:

the emergency messages include one or more of an alarm message and a sensor tamper message; and the non-emergency messages include one or more of a periodic supervision message and a low battery message.

* * * * *